United States Patent
Stumpf et al.

(10) Patent No.: US 12,215,989 B2
(45) Date of Patent: Feb. 4, 2025

(54) DIFFERENTIAL-PRESSURE-BASED FLOW METERS

(71) Applicant: Lam Research Corporation, Fremont, CA (US)

(72) Inventors: John Folden Stumpf, Portland, OR (US); Karl Frederick Leeser, West Linn, OR (US)

(73) Assignee: Lam Research Corporation, Fremont, CA (US)

( * ) Notice: Subject to any disclaimer, the term of this patent is extended or adjusted under 35 U.S.C. 154(b) by 446 days.

(21) Appl. No.: 17/424,159

(22) PCT Filed: Jan. 17, 2020

(86) PCT No.: PCT/US2020/014117
§ 371 (c)(1),
(2) Date: Jul. 19, 2021

(87) PCT Pub. No.: WO2020/154197
PCT Pub. Date: Jul. 30, 2020

(65) Prior Publication Data
US 2022/0107212 A1    Apr. 7, 2022

Related U.S. Application Data

(60) Provisional application No. 62/796,969, filed on Jan. 25, 2019.

(51) Int. Cl.
*G01F 1/36* (2006.01)
*G01F 1/42* (2006.01)

(52) U.S. Cl.
CPC .............. *G01F 1/363* (2013.01); *G01F 1/42* (2013.01)

(58) Field of Classification Search
CPC .................................. G01F 1/363; G01F 1/42
(Continued)

(56) References Cited

U.S. PATENT DOCUMENTS

| 4,249,164 A | * | 2/1981 | Tivy | G01F 1/42 340/611 |
| 5,190,075 A | * | 3/1993 | Tentler | G05D 7/0106 137/467.5 |

(Continued)

FOREIGN PATENT DOCUMENTS

| CN | 108872019 A | 11/2018 |
| CN | 113348339 | 9/2021 |

(Continued)

OTHER PUBLICATIONS

International Application Serial No. PCT/US2020/014117, International Search Report mailed May 21, 2020, 3 pgs.
(Continued)

*Primary Examiner* — Nathaniel T Woodward
(74) *Attorney, Agent, or Firm* — Schwegman Lundberg & Woessner, P.A.

(57) ABSTRACT

Various embodiments include apparatuses and methods to form the apparatus. In one embodiment, the apparatus is a flow meter having inlet and outlet portions for transporting a fluid along a flow path. A flow-restrictor element is formed within the flow path to impart a pressure drop to the fluid. A flow sensor has a first surface of the flow sensor in direct fluid communication with fluid flowing upstream of the flow-restrictor element and a second surface, on a portion of the flow sensor opposite to the first surface, in direct fluid communication with fluid flowing downstream of the flow-restrictor element. The flow sensor senses a differential pressure in the fluid due to the at least one flow-restrictor element. Other apparatuses and systems are disclosed.

19 Claims, 5 Drawing Sheets

(58) Field of Classification Search
USPC .................................................... 73/861.42
See application file for complete search history.

(56) References Cited

U.S. PATENT DOCUMENTS

| | | | | |
|---|---|---|---|---|
| 5,295,397 | A * | 3/1994 | Hall | G01F 1/363 |
| | | | | 137/44 |
| 5,576,498 | A * | 11/1996 | Shambayati | G01F 1/42 |
| | | | | 73/202.5 |
| 10,401,202 | B2 * | 9/2019 | Monkowski | G05D 7/0635 |
| 2003/0136196 | A1 * | 7/2003 | Wiklund | G01F 1/40 |
| | | | | 73/716 |
| 2004/0177703 | A1 * | 9/2004 | Schumacher | G01F 1/40 |
| | | | | 73/861.52 |
| 2006/0231149 | A1 | 10/2006 | Kulkarni | |
| 2011/0209560 | A1 * | 9/2011 | Ito | H01L 21/67051 |
| | | | | 73/861.42 |
| 2014/0299210 | A1 * | 10/2014 | Atherton | G01F 1/74 |
| | | | | 137/624.27 |
| 2017/0010625 | A1 | 1/2017 | Monkowski et al. | |
| 2017/0328750 | A1 | 11/2017 | Jehle et al. | |
| 2021/0102826 | A1 * | 4/2021 | Bestic | G01F 1/44 |

FOREIGN PATENT DOCUMENTS

| | | | | |
|---|---|---|---|---|
| EP | 3561482 | A1 * | 10/2019 | G01F 1/34 |
| JP | S53144372 | | 12/1978 | |
| JP | S55-036390 | | 3/1980 | |
| JP | S55-036390 | U | 3/1980 | |
| JP | S55109914 | | 8/1980 | |
| JP | H1151719 | | 2/1999 | |
| JP | 2003526097 | | 9/2003 | |
| JP | 2006162417 | | 6/2006 | |
| JP | 2011209130 | | 10/2011 | |
| JP | 2011209130 | A | 10/2011 | |
| JP | 2018197684 | | 12/2018 | |
| JP | 2022518487 | | 3/2022 | |
| KR | 101341161 | B1 | 12/2013 | |
| TW | 200632287 | | 9/2006 | |
| TW | I853880 | | 9/2024 | |
| TW | I853880 | B | 9/2024 | |
| WO | WO-2015131248 | A1 * | 9/2015 | G01F 1/36 |
| WO | WO-2020154197 | A1 | 7/2020 | |

OTHER PUBLICATIONS

International Application Serial No. PCT/US2020/014117, Written Opinion mailed May 21, 2020, 7 pgs.

"International Application Serial No. PCT US2020 014117, International Preliminary Report on Patentability mailed Aug. 5, 2021", 9 pages.

"Japanese Application Serial No. 2021-542327, Response Filed Dec. 26, 2023 to Notification of Reasons for Rejection mailed Oct. 17, 2023", w English Claims, 15 pgs.

"Japanese Application Serial No. 2021-542327, Notification of Reasons for Rejection mailed Jan. 30, 2024", w English Translation, 12 pgs.

"Taiwanese Application Serial No. 109102156, Response filed Feb. 19, 2024 to Office Action mailed Nov. 20, 2023", only English Claims, 7 pgs.

"Chinese Application Serial No. 202080010938.5, Response filed Mar. 22, 2024 to Office Action mailed Nov. 8, 2023", only English claims, 5 pgs.

"Japanese Application Serial No. 2021-542327, Notification of Reasons for Rejection mailed Oct. 17, 2023", W English Translation, 12 pgs.

"Chinese Application Serial No. 202080010938.5, Office Action mailed Nov. 8, 2023", w machine English Translation, 23 pgs.

"Japanese Application Serial No. 2021-542327, Voluntary Amendment filed Dec. 14, 2022", w English claims, 12 pgs.

"Taiwanese Application Serial No. 109102156, Office Action mailed Nov. 20, 2023", W English Translation, 22 pgs.

Chinese Application Serial No. 202080010938.5, Office Action mailed May 11, 2024, w/ English Translation, 33 pgs.

Japanese Application Serial No. 2021-542327, Examiners Decision of Final Refusal mailed Aug. 6, 2024, W/English Translation, 6 pgs.

Chinese Application Serial No. 202080010938.5, Office Action mailed Oct. 23, 2024, with English Translation, 17 pgs.

Japanese Application Serial No. 2021-542327, Response filed Nov. 29, 2024 to Examiners Decision of Final Refusal mailed Aug. 6, 2024, with English claims, 8 pgs.

Japanese Application Serial No. 2024-207853, Voluntary Amendment filed Dec. 11, 2024, with English claims, 14 pgs.

\* cited by examiner

Section A-A

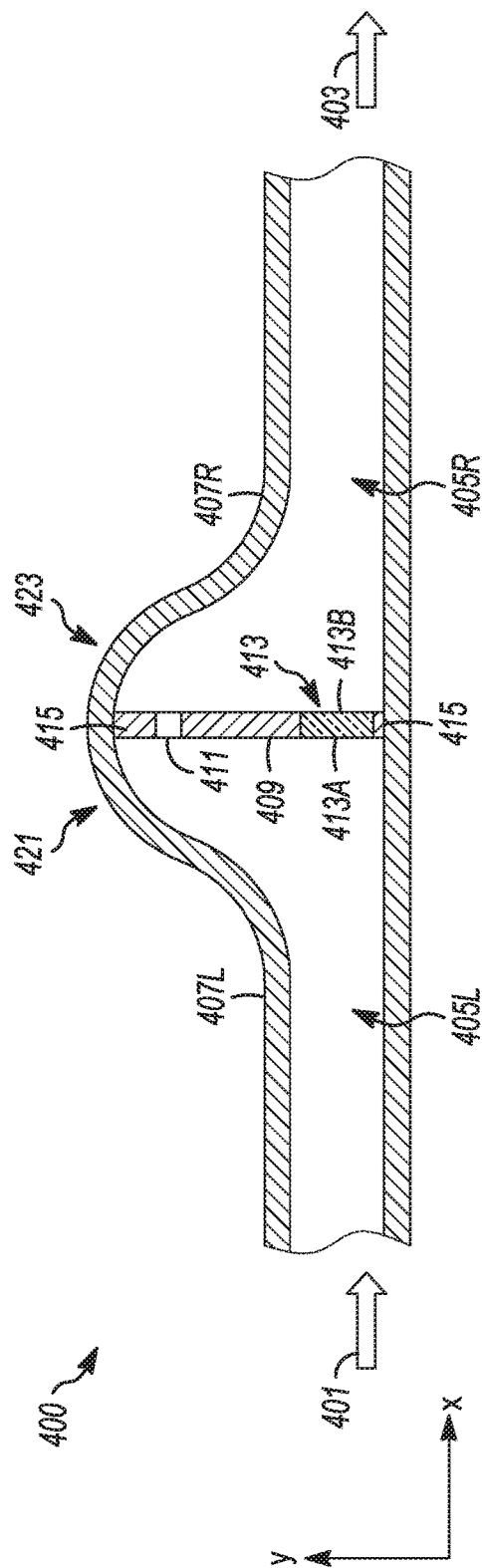
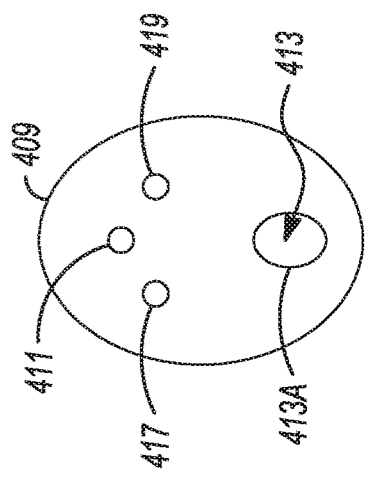
FIG. 4A
FIG. 4B

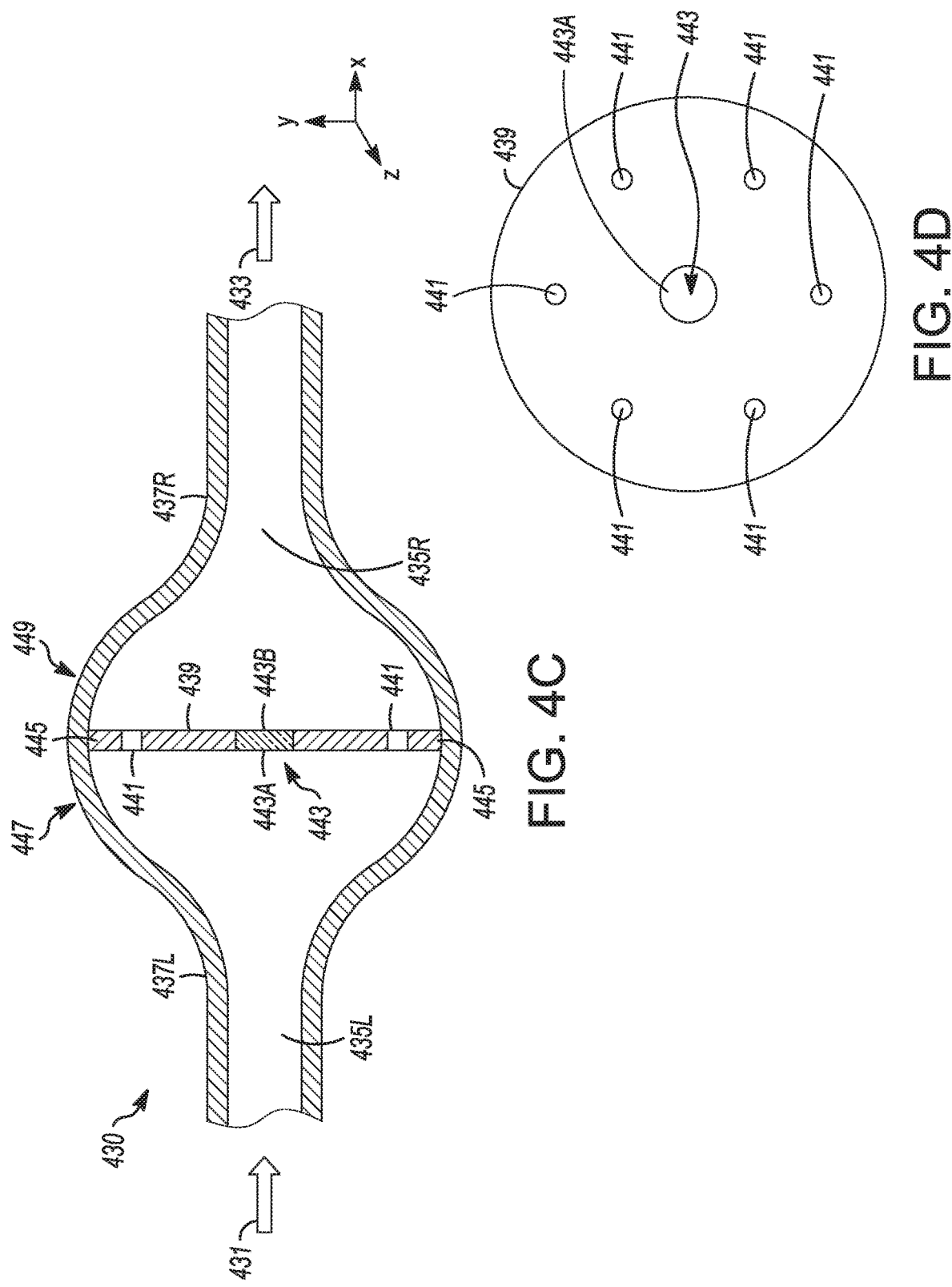

DIFFERENTIAL-PRESSURE-BASED FLOW METERS

CLAIM OF PRIORITY

This application is a U.S. National Stage Filing under 35 U.S.C. 371 from International Application No. PCT/US2020/014117, filed on Jan. 17, 2020, and published as WO 2020/154197 A1 on Jul. 30, 2020, which claims the priority benefit to U.S. Patent Application Ser. No. 62/796,969, filed on 25 Jan. 2019, and entitled "DIFFERENTIAL-PRESSURE-BASED FLOW METERS," each of which is incorporated by reference herein in its entirety.

TECHNICAL FIELD

The subject matter disclosed herein relates to various types of equipment used in the semiconductor and allied industries. More specifically, the disclosed subject matter relates to an apparatus to determine either a volumetric-flow of a fluid or a mass-flow of a fluid, both being based on a differential-pressure sensor.

BACKGROUND

Many industrial processes require accurate and precise measurement and control of various process fluids. Certain processes, such as measurement of non-compressible fluids (e.g., liquids) may only require measurement of a volumetric flow rate (e.g., measured in liters per minute, lpm, standard cubic centimeters per minute, sccm, or cubic meters per second, $m^3/s$). However, other processes, such as measurement of compressible fluids e.g., gases) often require a measurement of mass-flow rates (e.g., milligrams per minute, mg/m, or kilograms per second, kg/s). Thus, for compressible fluids, a discussion of volumetric mass-density (also referred to as simply mass density herein) of the fluid may be considered as being a function of absolute pressure and temperature. For example, in the semiconductor and allied industries, mass-flow meters and mass-flow controllers are used to accurately and precisely measure and control the mass of a process fluid that is introduced into a process chamber. A wide variety of techniques can be measured to flow rates in such devices, including thermal devices, ultrasonic time-of-flight devices, Coriolis devices, and pressure-based devices.

Pressure-based flow meters use a defined flow restriction to create a pressure drop responsive to the flow to be measured. If the pressure-based flow meters are arranged as a mass-flow meter or mass-flow controller, the meter also uses measurements of temperature, the resulting pressure drop, and (for compressible fluids) absolute pressure, combined with knowledge of both fluid properties and the flow restriction, to calculate mass-flow rate.

With reference to FIG. 1, a cross-sectional drawing of a differential-pressure-based flow meter 100 of the prior art is shown. The differential-pressure-based flow meter 100 includes a fluid inlet 109 and a fluid outlet 111 for a fluid flowing in a flow path 113, and a restrictor element 107. A first cavity 103A and a second cavity 103B are coupled to the flow path 113 by a first pressure port 105A and a second pressure port 105B, respectively. The first cavity 103A is in fluid-pressure communication with a first side 101A of a differential-pressure sensor 101 and the second cavity 103B is in fluid-pressure communication with a second side 101B of the differential-pressure sensor 101. As fluid flows in the flow path 113, the restrictor element 107 causes the pressure of the fluid to be greater on an upstream side (on a side of the fluid inlet 109) to be greater than the pressure on the downstream side (on a side of the fluid outlet) of the restrictor element 107. Consequently, the higher fluid-pressure (on the upstream side of the restrictor element 107) is communicated through the first pressure port 105A to the first cavity 103A. Similarly, the lower pressure (on the downstream side of the restrictor element 107) is communicated through the second pressure port 105B to the second cavity 103B. Thus, the first side 101A of the differential-pressure sensor 101 experiences a higher pressure than the second side 101B of the differential-pressure sensor 101. Although the cavities 103A, 103B are coupled to the flow path by the pressure ports 105A, 105B, the cavities are not directly coupled to the fluid flowing in the flow path 113. The cavities 103A, 103B therefore experience a change pressure on either side of the restrictor element 107.

A person of ordinary skill in the art understands the operation of the differential-pressure sensor 101. However, in general, the differential-pressure sensor 101 can be considered as a type of flexible diaphragm. When the pressure on the first side 101A of the differential-pressure sensor 101 is greater than the pressure on the second side 101B of the differential-pressure sensor 101, the differential-pressure sensor 101 flexes or bends. The flexing produces an electrical signal that is proportional to the difference in the two pressures. Therefore, the differential-pressure sensor 101 can be calibrated for the flow rate of the fluid based on the electrical signal produced.

However, a significant concern with the differential-pressure-based flow meter 100 is that the first cavity 103A and the second cavity 103B each comprise a "dead volume" that is not flushed during operation of the differential-pressure-based flow meter 100. Consequently, various types of contamination may become trapped within either of the cavities 103A, 103B, only potentially to be released into the fluid flow within the flow path 113. In the case of the differential-pressure-based flow meter 100 being used in a semiconductor process operation, the contamination may produce a defect in one or more integrated circuits being fabricated. Such a defect can cause the one or more integrated circuits to be non-operational and may represent a significant loss in revenue to the company fabricating the integrated circuits.

Therefore, in various embodiments described herein, the disclosed subject matter discloses several types of differential-pressure-based flow meters, which do not have any dead volumes.

The information described in this section is provided to offer the skilled artisan a context for the following disclosed subject matter and should not be considered as admitted prior art.

BRIEF DESCRIPTION OF THE FIGURES

FIG. 4A shows a cross-sectional drawing of another embodiment of a differential-pressure-based flow meter in accordance with the disclosed subject matter;

FIG. 4B shows details of a flow-sensor carrier used with the embodiment of the differential-pressure-based flow meter of FIG. 4A;

FIG. 4C shows a cross-sectional drawing of another embodiment of a differential-pressure-based flow meter in accordance with the disclosed subject matter; and FIG. 4D shows details of a flow-sensor carrier used with the embodiment of the differential-pressure-based flow meter of FIG. 4C.

DETAILED DESCRIPTION

The disclosed subject matter will now be described in detail with reference to a few general and specific embodiments as illustrated in various ones of the accompanying drawings. In the following description, numerous specific details are set forth in order to provide a thorough understanding of the disclosed subject matter. It will be apparent, however, to one skilled in the art, that the disclosed subject matter may be practiced without some or all of these specific details. in other instances, well-known process steps, construction techniques, or structures have not been described in detail so as not to obscure the disclosed subject matter.

In each of the embodiments described, the various differential-pressure-based flow meters may be considered to be volumetric-flow meters. However, upon reading and understanding the disclosed subject matter, a person of ordinary skill in the art will recognize how to convert each of the various embodiments of the disclosed volumetric-flow meters into mass-flow meters or mass-flow controllers. Such techniques are also described in more detail, below.

Figure 1:
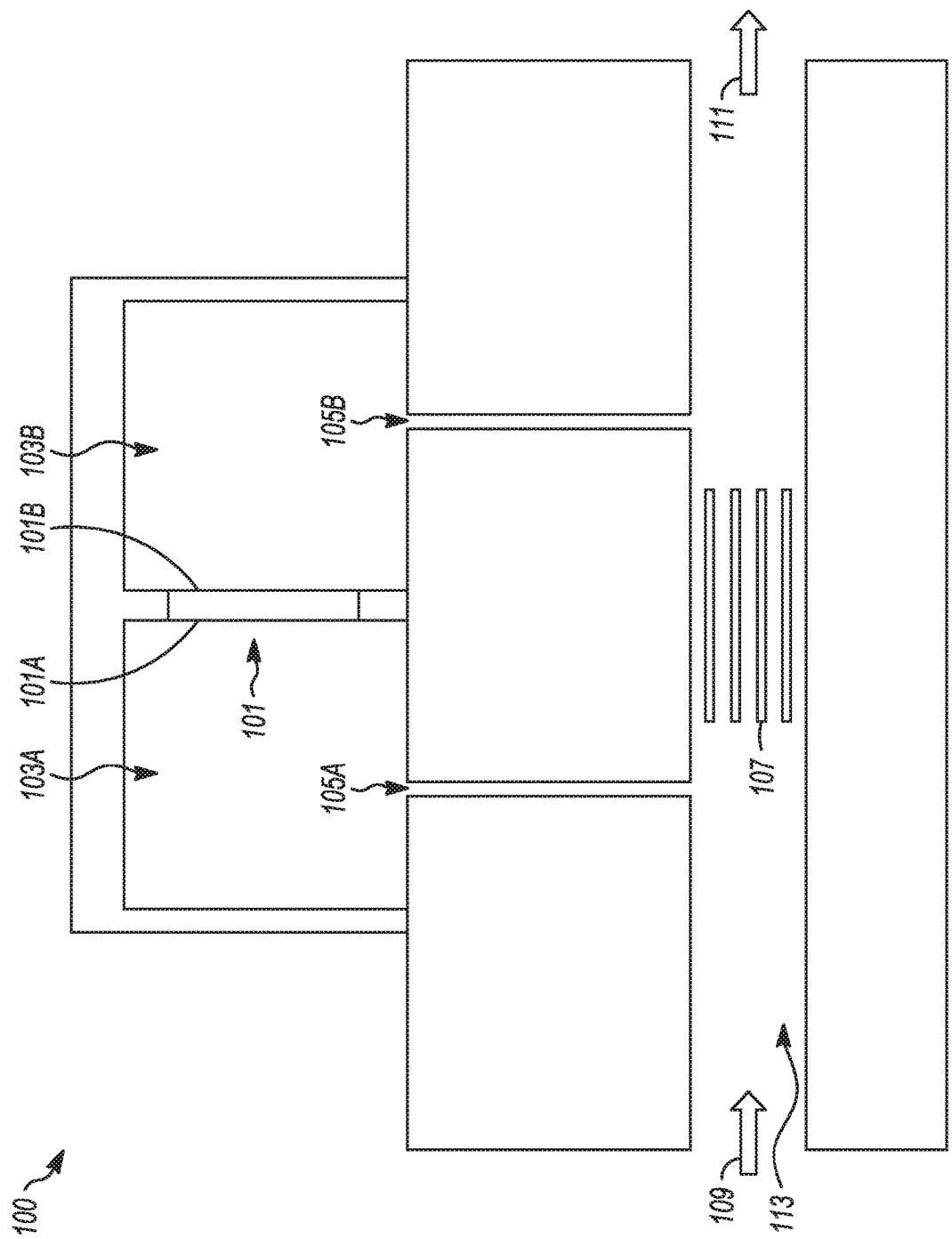
FIG. 1 shows a cross-sectional drawing of a differential-pressure-based flow meter of the prior art.
Figure 2:
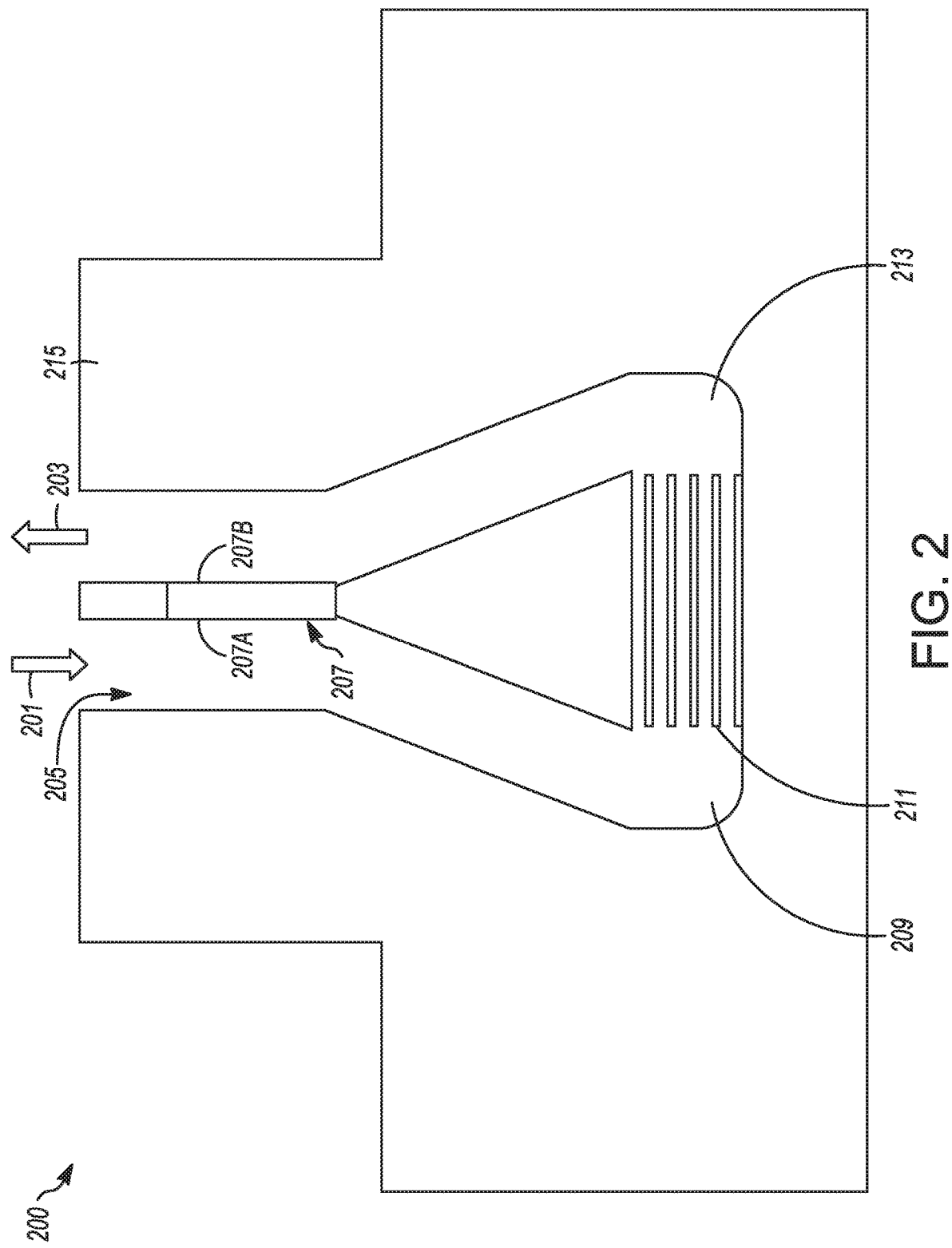
FIG. 2 shows a cross-sectional drawing Of an embodiment of differential-pressure-based flow meter in accordance with the disclosed subject matter.

With reference now to FIG. 2, a cross-sectional drawing of an embodiment of a differential-pressure-based flow meter 200 in accordance with the disclosed subject matter is shown. The differential-pressure-based flow meter 200 is shown to include a fluid inlet 201 and a fluid outlet 203 for a fluid to flow in a flow path 205. FIG. 2 is also shown to include a flow sensor 207, having a first side 207A and a second side 207B, as well as a flow-restrictor element 211, and a flow-meter body 215. Since fluid flowing in the flow path 205 is in direct hydraulic or pneumatic communication with the flow sensor 207, there is no need for the first and second pressure ports 105A, 105B of FIG. 1 to relay the pressure to the first and second cavities 103A, 103B as required by the prior art differential-pressure-based flow. Consequently, since the pressure ports 105A, 105B and the cavities 103A, 103B are not required with various embodiments of the disclosed subject matter, there are no dead volumes to trap, and later potentially release, any contaminants. Further, since the flow path is continuous, the differential-pressure-based flow meter 200 is continuously flushed while in operation.

The flow-restrictor element 211 is located between a first bend 209 in the flow path 205 and a second bend 213 in the flow path 205. The first and second bends 209, 213 allow fluid flowing in the flow path 205 to flow past opposite sides of the flow sensor 207 (i.e., the first side 207A and the second side 207B), The flow-restrictor element 211 may comprise any type of flow-restriction device that causes fluid flowing in the flow path 205 to have a higher pressure upstream of the flow-restrictor element 211 than downstream of the flow-restrictor element 211. an certain embodiments, the design of the differential-pressure-based flow meter 200 is bi-directional. Thus, the pressure differential on opposite sides of the flow sensor 207 may be reversed) Such a flow-restriction device may include, for example, orifices machined or otherwise formed in a plate positioned across the flow path 205, or a laminar-flow element. In other embodiments, the flow-restrictor element 211 may comprise an area of the flow path 205 with a reduced cross-sectional area to increase the pressure of fluid flowing upstream of the reduced-area flow path. Such devices and techniques are known in the art.

In one embodiment, the flow sensor 207 comprises a differential-pressure sensor that senses a difference in pressure experienced as a difference in pressure between fluid pressure on the first side 207A and the second side 207B of the flow sensor 207. In this embodiment, the flow sensor 207 can be considered as a type of flexible diaphragm.

As is known to a person of ordinary skill in the art, a differential-pressure sensor can measure a much larger range of fluid flow rates than other flow sensors known in the art. The range of fluid flow rates that are detectable is known as a "turndown ratio." The turndown ratio is also referred to as "rangeability," and indicates the range over which a flow meter can accurately measure the flow rate of the fluid. Therefore, the turndown ratio expresses the high end of a measurement range with the low end of the measurement range and is expressed as a ratio between the high end and the low end. For each of the various embodiments of the flow meters disclosed herein, the turndown ratio may be at least about 100:1 or greater.

In various embodiments and as shown in FIG. 2, the flow sensor 207 is arranged to measure a flow rate of a fluid that is flowing in directions that are approximately 180° apart relative to each other on opposite sides of the flow sensor 207 (i.e., the inlet and outlet flows on opposite side of the flow sensor 207 are substantially parallel to one another but in opposite directions). However, there is no requirement that fluid at the fluid inlet 201 and the fluid outlet 203 be flowing substantially parallel to one another. That is, fluid flowing from the fluid inlet 201 need not be flowing toward the fluid outlet 203 in nearly opposite directions. The fluid inlet 201 and the fluid outlet 203 may be arranged at, for example, angles that are about 0° to about 45° apart. In other embodiments, the fluid inlet 201 and the fluid outlet 203 may be arranged at, for example, at angles that are about 45° to about 60° apart. In still other embodiments, the fluid inlet 201 and the fluid outlet 203 may be arranged at, for example, at angles that are about 60° to about 90° apart or more. Consequently, in embodiments where it is desired that the fluid flow in proximity to the flow sensor be flowing in a laminar-flow regime, the fluid inlet 201 and the fluid outlet 203 may be arranged at various angles and will be considered as being within a scope of the disclosed subject matter.

For example, each of the various direction scenarios of the fluid inlet 201 and the fluid outlet 203 described above may be flowing in directions that are approximately 180° to each other on opposite sides of the flow sensor 207 in a portion of the flow path that is proximate to the flow sensor 207. However, distal to the flow sensor 207 (e.g., upstream and downstream from the flow sensor 207 at appropriate distances to accommodate a laminar-flow regime near the flow sensor 207, as described in more detail below), the flow paths can be arranged in any of the relative angles from one another as described above for convenience in placing couplers or fittings onto the differential-pressure-based flow meter 200.

With continued reference to FIG. 2, the first bend 209 and the second bend are on opposite sides of the flow-restrictor element 211. However, if, for a given implementation of the differential-pressure-based flow meter 200, it is desired that fluid flow be in a laminar-flow regime, at least one of the first bend 209 and the second bend 213 may each be located at least five-to-seven diameters (based on an internal dimension and assuming a cross-section of the flow path is circular) upstream and downstream, respectively, of the flow-restrictor element 211. Alternatively, or in addition to the increased path length at least five-to-seven diameters, various flow-straightener devices known in the art. may be used within the flow path 205 as well. Based on basic principles of fluid mechanics, a person of ordinary skill in the art will recognize how to arrange and size the flow path 205 to accommodate laminar fluid flow. For example, if the flow path 205 does not have a circular cross section, another relevant internal characteristic linear dimension such as, for example, a hydraulic diameter in the case of a flow path having a rectangular cross-section, lengths of the channel upstream and downstream of the bends 209, 213 may be selected to restore laminar flow. Based upon reading and understanding the disclosed subject matter, a person of ordinary skill in the art will recognize how to determine lengths of flow paths (e.g., before or after a bend) to produce a laminar flow for a given fluid flow rate, fluid density, and dynamic viscosity of the fluid.

As alternative to providing a laminar fluid flow, and in other embodiments, the flow sensor 207 may be calibrated for turbulent-flow or transitional-flow regimes where a variation in flow rate is fairly consistent. The tolerable variation in flow may be determined empirically for a given fluid and flow rate of interest or may be pre-determined using computational fluid dynamic (CFD) analysis as known in the art. For example, the person of ordinary skill in the art may determine that turbulent flow rates may be within a predetermined tolerance if the flow does not vary more than, for example, ±10% of a nominal flow rate. Such calibration techniques are known in the relevant art.

Overall, the differential-pressure-based flow meter 200 may be constructed by various means known in the art. For example, in various embodiments, the differential-pressure-based flow meter 200 may be constructed from one or more laminations of material, where each lamination is at least partially machined or otherwise formed (e.g., molded) prior to a final assembly. In a specific-exemplary embodiment, a first laminate portion may be machined from 316L stainless. A second laminate portion, substantially mirroring the first laminate portion is also machined. The flow sensor 207 and the flow-restrictor element 211 are then placed and adhered (e.g., welded, chemically adhered, or otherwise bonded) into one of the laminate portions. The two laminate portions are then welded or bonded together.

In other embodiments, the flow-meter body 215 may have portions cast, molded, sintered, or otherwise formed and joined together. In still other embodiments, the flow-meter body may be partially or fully produced using additive-manufacturing techniques (e.g., printed from a three-dimensional printer). Such techniques and others are known in the art.

The flow-meter body 215 may be formed from one or more of a number of materials known in the art. For example, if the differential-pressure-based flow meter 200 is expected to carry caustic or corrosive fluids, various types of ceramic material (e.g., aluminum oxide, $Al_2O_3$, zirconium dioxide, $ZrO_2$, or beryllium oxide, BeO) or stainless steel (e.g., types 304 or 316L) may be selected for forming at least portions of the flow-meter body 215. In other applications, various types of machinable and/or formable polymers and high-performance plastics may be selected to form at least portions of the flow-meter body 215.

Figure 3A:
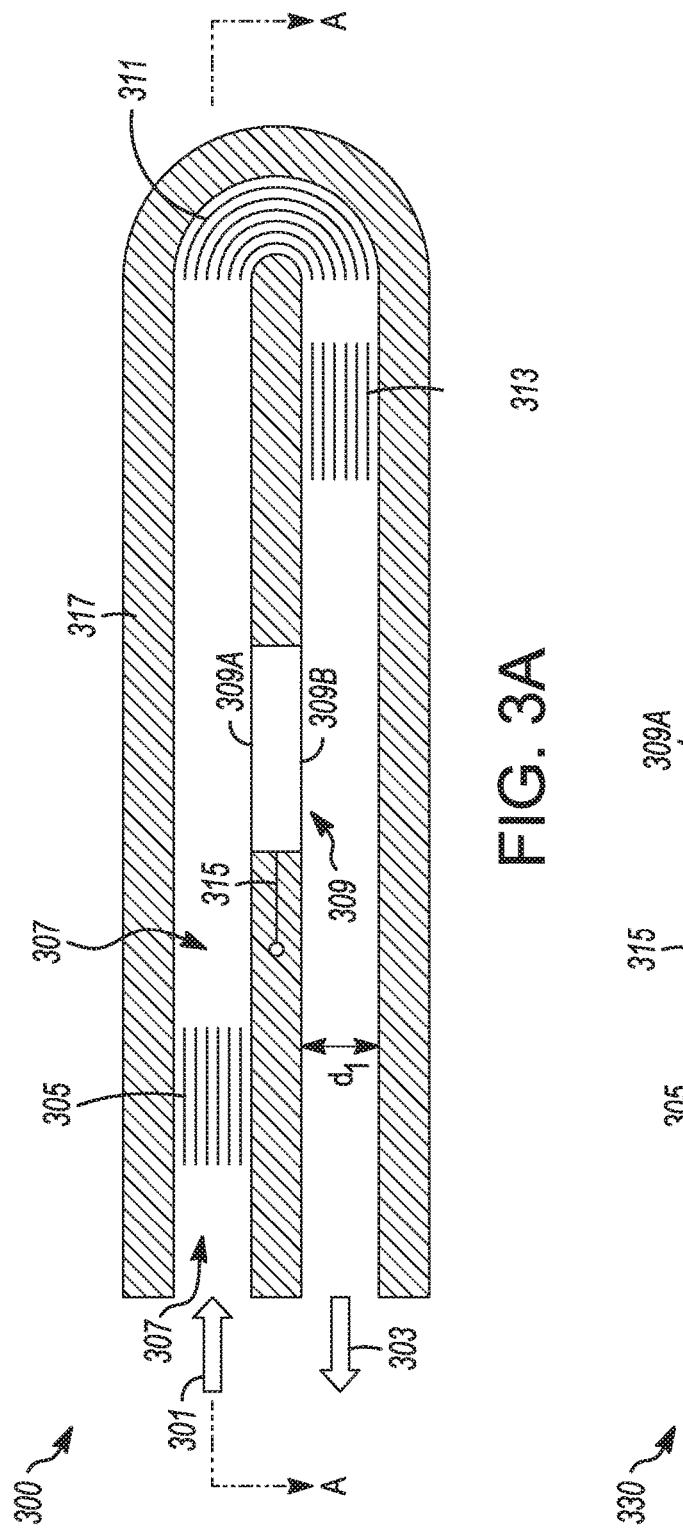
FIG. 3A shows a cross-sectional drawing of another embodiment of a differential-pressure-based flow meter in accordance with the disclosed subject matter.

FIG. 3A shows a cross-sectional drawing of another embodiment of a differential-pressure-based flow meter 300 in accordance with the disclosed subject matter. When used to measure flows of fluids in the laminar-flow regime, the long flow path reduces or eliminates a possibility of viscous impingement of the fluid onto faces of a flow sensor 309, thus reducing or eliminating measurements errors due to transitional or turbulent flow. However, as discussed in more detail below, the differential-pressure-based flow meter 300 can also be calibrated for use with flows in transitional-flow regimes and turbulent-flow regimes.

The differential-pressure-based flow meter 300 of FIG. 3 is shown to include a fluid inlet 301 and a fluid outlet 303 for a fluid flowing in a flow path 307. FIG. 3 is shown to include the flow sensor 309, having a first side 309A and a second side 309B, and a sensor wire 315 to couple the flow sensor 309 to an external device, such as a flow controller or microprocessor (not shown). FIG. 3 is also shown to include a first laminar-flow element 305, a second laminar-flow element 313, a flow-restrictor element 311, and a flow-meter body 317.

In various embodiments, least one of the first laminar-flow element 305 and the second laminar-flow element 313 is optional. Whether the laminar-flow elements 305, 313 are optional depends at least partially on whether the flow sensor 309 is arranged to measure a flow rate of fluid in a laminar-flow regime, a transitional-flow regime, or a turbulent-flow re regime as discussed above with reference to the differential-pressure-based flow meter 200 of FIG. 2.

Another consideration for whether the laminar-flow elements 305, 313 are optional depends at least partially on a physical location (distance) of the first side 309A of the flow sensor 309 in relation to the fluid inlet 301 as well as a physical location (distance) of the second side 30913 of the flow sensor 309 in relation to the flow-restrictor element 311. For example, the differential-pressure-based flow meter 300 may be constructed such that the flow sensor 309 is a sufficient distance away from the fluid inlet 301, or a combination of tubes, channels, or other piping that transports the fluid to the differential-pressure-based flow meter 300 is sufficiently long such that a first velocity profile of the fluid is in a laminar-flow regime at least immediately prior to the fluid passing by an upstream edge of the flow sensor 309 on the first side 309A. Such determinations and calculations are well-understood by a person of ordinary skill in the art. Similarly, a physical distance from a downstream side of the flow-restrictor element 311 to an upstream edge of the flow sensor 309 on the second side 309B can be constructed such that a second velocity profile of the fluid is in a laminar-flow regime.

Accordingly, one or more laminar-flow elements 305, 313 may be used in the differential-pressure-based flow meter 300. For example, for various embodiments and configurations of the differential-pressure-based flow meter 300, more than two laminar-flow elements (only two are shown) may be used. Additionally, more than one of the flow-restrictor elements 311 (only one is shown) may be used for certain types of fluid or for certain ranges of fluid flow. For example, when measuring low flow rates, more than one of the flow-restrictor elements 311 may be used to increase a pressure differential where the flow sensor 309 is selected to be a differential-pressure sensor.

As with the differential-pressure-based flow meter 200 of FIG. 2, since fluid flowing in the flow path 205 is in direct hydraulic or pneumatic communication with the pressure sensor, there is no need for the first and second pressure ports 105A, 105B to relay the pressure to the first and second cavities 103A, 103B as required by the differential-pressure-based flow meter of FIG. 1 of the prior art. Consequently, since the pressure ports 105A, 105B and the cavities 103A, 103B are not required with various embodiments of the disclosed subject matter, there are no dead volumes to trap, and later potentially release, any contaminants.

As discussed with regard to the flow-restrictor element 211 of FIG. 2, the flow-restrictor element 311 of FIG. 3 may comprise various types of flow-restriction devices. For example, the flow-restrictor element 311 may be a laminar-flow element, a plate configured transverse to a direction of fluid flow having one or multiple orifices drilled or otherwise formed therethrough, or a restrictive bend in the flow path with no separate flow restriction device. Also, the flow sensor 309 may comprise one or more types of flow sensor as described above with reference to the flow sensor 207 of FIG. 2. For ease in understanding the disclosed subject matter provided herein, the flow sensor 309 may be considered to be a differential-pressure sensor.

As is also discussed with reference to FIG. 2, the flow sensor 309 is arranged to measure a flow rate of a fluid that is flowing in directions that. are approximately 180° to each other on opposite sides of the flow sensor 309 (i.e., the inlet and outlet flows on opposite side of the flow sensor 309 are substantially parallel to one another but in opposite directions). However, there is no requirement that fluid at the fluid inlet 301 and the fluid outlet 303 be flowing substantially parallel to one another. That is, fluid flowing from the fluid inlet 301 need not be flowing toward the fluid outlet 303 in nearly opposite directions. The fluid inlet 301 and the fluid outlet 303 may be arranged at, for example, at angles that are about 0° to about 45° apart. In other embodiments, the fluid inlet 301 and the fluid outlet 303 may be arranged at, for example, at angles that are about 45° to about 60° apart. In still other embodiments, the fluid inlet 301 and the fluid outlet 303 may be arranged at, for example, at angles that are about 60° to about 90° apart or more. Consequently, in embodiments where it is desired that the fluid flow in proximity to the flow sensor be flowing in a laminar-flow regime, the fluid inlet 301 and the fluid outlet 303 may be arranged at various angles and will be considered as being within a scope of the disclosed subject matter.

For example, each of the various direction scenarios of the fluid inlet 301 and the fluid outlet 303 described above may be flowing in directions that are approximately 180° to each other on opposite sides of the flow sensor 309 in a portion of the flow path that is proximate to the flow sensor 309. However, distal to the flow sensor 309 (e.g., upstream and downstream from the flow sensor 309 at appropriate distances to accommodate a laminar-flow regime near the flow sensor 309, as described in more detail herein), the flow paths can be arranged in any of the relative angles from one another as described above for convenience in placing couplers or fittings onto the differential-pressure-based flow meter 300.

With continuing reference to FIG. 3A, the flow-restrictor element 311 is located between the first laminar-flow element 305 in the flow path 307 and the second laminar-flow element 313 in the flow path 307. Consequently, the first and second laminar-flow elements 305, 313 allow fluid flowing in the flow path 307 to flow past opposite sides of the flow sensor 309 (the first side 309A and the second side 309B). When used with a flow sensor 309 that is based on a differential-pressure sensor, the flow-restrictor element 311 may comprise any type of flow-restriction device that causes fluid flowing in the flow path 307 to have a higher pressure upstream of the flow-restrictor element 311 than downstream of the flow-restrictor element 311. Such a flow-restriction device may include, for example, orifices machined or otherwise formed in a plate positioned across the flow path 307. In various embodiments, the flow-restrictor element 311 may also comprise an additional laminar-flow element. (Laminar-flow elements are known in the art to cause a pressure drop across the length of the laminar-flow element.) In other embodiments, as described above with reference to FIG. 2, a cross-sectional area of the flow path 307 may be reduced so as to increase the pressure of fluid flowing upstream of the reduced-area flow path. in various embodiments, a diameter, $d_1$, of the flow path 307 may be selected to be larger or smaller than a diameter, $d_2$, of a second portion of the flow path 307 (see FIG. 3B). Such devices and techniques are known in the art.

Figure 3B:
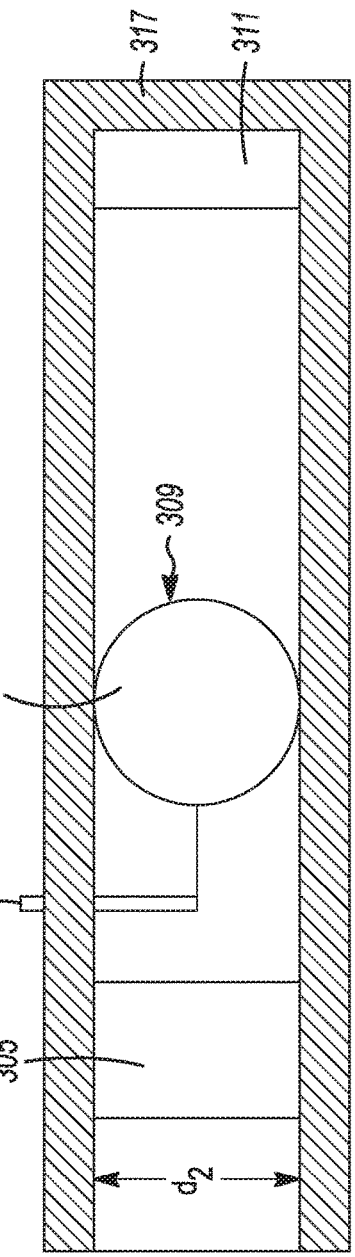
FIG. 3B shows a section of the embodiment of the differential-pressure-based flow meter of FIG. 3A.

FIG. 3B shows a section 330 (at Section A-A of FI(. 3A) of the embodiment of the differential-pressure-based flow meter 300 of FIG. 3A. Upon reading and understanding the disclosed subject matter, a person of ordinary skill in the art will recognize that the differential-pressure-based flow meter 300 of FIGS. 3A and 3B may be constructed using, for example, any of the materials or techniques described above with reference to FIG. 2.

FIG. 4A shows a cross-sectional drawing of another embodiment of a differential-pressure-based flow meter 400 in accordance with the disclosed subject matter. Although the differential-pressure-based flow meter 400 is described as being based on a differential-pressure sensor, the differential-pressure-based flow meter 400 can use any of a variety of flow sensors known in the art. Thus, the term "differential-pressure-based flow meter" is used primarily for ease in understanding various embodiments of FIG. 4A as described below.

The differential-pressure-based flow meter 400 of FIG. 4 is shown to include a fluid inlet 401, a fluid outlet 403, an upstream-portion flow path 405L, a downstream-portion flow path 405R a first-enclosure portion 407L, a second-enclosure portion 407R, and a flow-sensor carrier 409. The upstream-portion flow path 405L and the downstream-portion flow path 405R are upstream and downstream, respectively, of the flow-sensor carrier 409. The flow-sensor carrier 409 has an upstream side 413A and a downstream side 413B.

FIG. 4B shows details of the flow-sensor carrier 409 used with the embodiment of the differential-pressure-based flow meter 400 of FIG. 4A. With concurrent reference to FIG. 4A and FIG. 4B, the flow-sensor carrier 409 is shown to include a differential-pressure sensor 413 and a first 411, a second 417, and a third through-hole 419. The through holes 411, 417, 419 comprise orifices that are formed in substantially a same direction through the flow-sensor carrier 409 through which fluid is allowed to flow from the upstream-portion flow path 405L to the downstream-portion flow path 405R.

Upon reading and understanding the disclosed subject matter, a person of ordinary skill in the art will recognize that at least two of the first, second, and third through holes 411, 417, 419 are optional and that only a single through hole in the flow-sensor carrier 409 is needed. in other embodiments, there may be more than three through holes (e.g., four or more). Further, any of the through holes may be formed in various diameters and shapes through various techniques known independently in the art. Such techniques include laser drilling, machine drilling, Electrical Discharge Machining (EDM), or other subtractive machining operations known in the art. For example, at least one of the through holes 411, 417, 419 may have a conical or tapered inlet and/or outlet and may have a circular, elliptical, or other cross-sectional hole. In other embodiments, the entirety of the flow-sensor carrier 409 may be formed from additive machining techniques as discussed above. After being formed, the differential-pressure sensor 413 may be press-fit, welded, chemically adhered, or otherwise bonded to the flow-sensor carrier 409 by techniques known independently in the art.

In a specific exemplary embodiment, and as shown, the first-enclosure portion 407L comprises an inlet tube structure having two ends: a first end (including the fluid inlet 401) and a second end arranged to accept the flow-sensor carrier 409. The first end may be flared into, for example, a VCR® metal-to-metal seal feature, as is known in the art, or welded onto a male VCR® tube stub. In other embodiments, the first end may be formed as, for example, a VCO® O-ring face seal fitting (VCR® and VCO® seal fittings are registered trademarks of the Swagelok Company of Solon, Ohio, USA). A person of ordinary skill in the art will recognize that other types of fittings may be used as well.

The remaining end (i.e., the second end) of the inlet tube structure may be flared, in substantially one direction (e.g., in a positive y-direction). The substantially one-directional flaring leaves a lower portion of the first-enclosure portion 407L (e.g., the inlet tube) substantially undeformed and a lower portion of the second-enclosure portion 407R (e.g., the outlet tube) substantially undeformed, thereby forming an elliptical cross-sectional area, at interface area 415. The substantially one-directional flaring produces a first-interface feature 421 and a second-interface feature 423 as shown in FIG. 4A.

Continuing with this specific exemplary embodiment, the second-enclosure portion 407R comprises an outlet tube that starts with a flared portion on the upstream portion of the outlet tube, forming the second-interface feature 423, to mate with the first-interface feature 421. The outlet tube terminates, on a downstream portion of the outlet tube, with a coupling feature to connect the outlet tube to, for example, a proportioning-valve block (not shown but known in the art). Either the outlet end of the outlet tube or the proportioning-valve block terminates with, for example, a VCR® or VCO® seal fitting feature. The flow-sensor carrier 409 is then placed, formed, or otherwise fitted between the inlet tube and the outlet tube at the interface features 421, 423. The inlet tube and the outlet tube are then adhered to one another at the interface area 415 to be substantially colinear with one another (e.g., by orbital-laser welding, an interference or press fit, chemical adhesives, combinations thereof, or other techniques known in the art).

The first-enclosure portion 407L, the second-enclosure portion 407R, and the flow-sensor carrier 409 can be constructed using any of one or more of the materials or techniques described above with reference to FIG. 2. Alternatively, the first-enclosure portion 407L and the second-enclosure portion 407R may be constructed using various types of tubing materials known in the art including, for example, stainless-steel tubing, copper tubing, polymer-based tubing, or other materials. The tubing is selected based at least partially on fluid flow considerations (e.g., a corrosive nature of the fluids as well as pressures at which the fluid is carried), contamination considerations, and other considerations known in the art.

In another specific exemplary embodiment, the first-enclosure portion 407L and the second-enclosure portion 407R can comprise tube structures. As is known in the art, tube structures can be formed from, for example, thin-wall tubing that, on its own, may not withstand the operating pressures encountered during fluid transport. However, the tube structures could be backed up with one or more structural components, such as a mold of the outside of each of the tube structures to ensure that the tubes do not deform during operation. The back-up components could comprise, for example, fiber-reinforced polymer, ceramics, polymers, metals, or other suitable materials known in the art. Additionally, since the back-up components are not wetted, the components have limited or no purity requirements. Consequently, the function of structure is separated from the function of maintaining fluid purity. Thin-walled tubes can be selected from materials known to resist chemistry and formed to reduce or eliminate particle traps. Further, as is known in the art, operations such as hydroforming, pneumatic forming, or mechanical flaring may be used to form the tubes.

Depending on factors such as fluid velocity, fluid density, and fluid dynamic viscosity, the velocity impingement on the upstream side 413A of the flow-sensor carrier 409, and consequently on the differential-pressure sensor 413, may be significant. Further, the drag force produced by the flow-sensor carrier 409 may also be significant. Therefore, the differential-pressure-based flow meter 400 may need to be calibrated for each of various types of fluid that are carried within the differential-pressure-based flow meter 400. However, the differential-pressure-based flow meter 400 of FIG. 4A may be less expensive to construct than the differential-pressure-based flow meters 200, 300 of FIGS. 2 and FIG. 3A.

Similar in at least some aspects to the differential-pressure-based flow meter 400 of FIG. 4A and FIG. 4B, FIG. 4C shows a cross-sectional drawing of another embodiment of a differential-pressure-based flow meter 430 in accordance with the disclosed subject matter.

The differential-pressure-based flow meter 430 of FIG. 4C is shown to include a fluid inlet 431, a fluid outlet 433, a upstream-portion flow path 435L, a downstream-portion flow path 435R, a first-enclosure portion 437L, a second-enclosure portion 437R, and a flow-sensor carrier 439. The upstream-portion flow path 435L and the downstream-portion flow path 435R are upstream and downstream, respectively, of the flow-sensor carrier 439. The flow-sensor carrier 439 has an upstream side 443A and a downstream side 443B.

FIG. 4D shows details of the flow-sensor carrier 439 used with the embodiment of the differential-pressure-based flow meter 430 of FIG. 4C. With concurrent reference to FIG. 4C and FIG. 4D, the flow-sensor carrier 439 is shown to include a differential-pressure sensor 443, and a plurality of through holes 441. The plurality of through holes 441 comprise orifices that are formed in substantially a same direction through the flow-sensor carrier 439 through which fluid is allowed to flow from the upstream-portion flow path 435L to the downstream-portion flow path 435R.

Upon reading and understanding the disclosed subject matter, a person of ordinary skill in the art will recognize that only a single one of the plurality of through holes 441 in the flow-sensor carrier 439 is needed. Further, the skilled artisan will recognize that additional through holes, beyond the number shown in FIG. 4D, may be used. The plurality of through holes 441, as well as the flow-sensor carrier 439, may be formed from various materials and possess various shapes as described above with reference to FIGS. 4A and 4B.

The differential-pressure-based flow meter 430 of FIG. 4C varies from the differential-pressure-based flow meter 400 of FIG. 4A in that an interface area 445 of FIG. 4C has a substantially round cross-sectional area, in comparison with the substantially elliptical cross-sectional area at the interface area 415 of FIG. 4C. That is, a first-interface feature 447 and a second-interface feature 449 of FIG. 4C may be flared in substantially three directions (e.g., in positive x, y, and z directions).

Once the first-interface feature 447 and the second-interface feature 449 of FIG. 4C are flared, the flow-sensor carrier 439 is then placed, formed, or otherwise fitted between the first-enclosure portion 437L and the second-enclosure portion 437R at the interface features 447, 449. The first-enclosure portion 437L and the second-enclosure portion 437R are then adhered to one another at the interface area 445 to be substantially colinear with one another (e.g., by orbital-laser welding, an interference or press fit, chemical adhesives, combinations thereof, or other techniques known in the art).

As is recognizable to a person of ordinary skill in the art, each of the various embodiments of the differential-pressure-based volumetric flow meters described herein may be formed into mass-flow meters or mass-flow controllers by adding additional components. As is known in the art, a mass-flow controller is arranged to control automatically the flow rate of a fluid according to a set flow rate sent as an electrical signal in the form of a predetermined setpoint. Especially in the case where the fluid is a gas, the mass-flow controller is substantially unaffected by changes in gas pressure due to temperature changes or other factors as these factors can be measured separately and considered. For example, in addition to the various volumetric-flow meters described above, a mass-flow controller also includes a control valve, a valve actuator, and a controller all coupled to the volumetric-flow meter. Upon reading and understanding the disclosed subject matter, the person of ordinary skill in the art would readily recognize which components are needed and how to couple those components to the various volumetric-flow meters described herein to form various types of mass-flow meters.

Overall, the disclosed subject matter contained herein describes or relates generally to flow meter components that are operable with and can be used to control portions of operations of "tools" a semiconductor fabrication environment (fab). Such tools can include various types of deposition (including plasma-based tools such as ALD (atomic layer deposition), CVD (chemical vapor deposition), PECVD (plasma-enhanced CVD), etc.) and etching tools (e.g., reactive-ion etching (RIE) tools), as well as various types of thermal furnaces (e.g., such as rapid thermal annealing and oxidation), ion implantation, and a variety of other process and metrology tools found in various fabs and known to a person of ordinary skill in the art. However, the disclosed subject matter is not limited to semiconductor environments and can be used in a number of machine-tool environments such as fluid control operations in robotic assembly, manufacturing, machining environments (e.g., including those operations using physical vapor deposition (PVD tools)), as well as a variety of other environments. Upon reading and understanding the disclosure provided herein, a person of ordinary skill in the art will recognize that, various embodiments of the disclosed subject matter may be used with other types of process and a wide variety of tools and components.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various configurations.

Although various embodiments are discussed separately, these separate embodiments are not intended to be considered as independent techniques or designs. As indicated above, each of the various portions may be inter-related and each may be used separately or in combination with other embodiments discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. For example, each of the various embodiments is shown and described as using a single differential-pressure sensor. However, upon reading and understanding the disclosed subject matter, a person of ordinary skill in the art will recognize that two or more differential-pressure sensors may be used in each of the embodiments depending upon, for example, a viscosity of the fluid that is expected to be transported through the respective flow meters. Further, one or more flow restrictor elements may be used with each of the various embodiments described herein to increase a differential-pressure drop measured by the various differential-pressure sensors. A higher pressure-drop can be used when low fluid flow rates (e.g., less than 1 sccm) are to be measured; the higher pressure-drop increasing the accuracy of the flow meter at low flow rates.

Further, functionally equivalent methods and devices within the scope of the disclosure, in addition to those enumerated herein, will be apparent to the skilled artisan from the foregoing descriptions. Portions and features of some embodiments, materials, and construction techniques may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What claimed is:

1. A flow meter, comprising:
   a flow path having an inlet portion and an outlet portion and configured to transport a fluid, the inlet portion and the outlet portion of the flow path being arranged substantially parallel to each other to transport the fluid in substantially opposing directions in the inlet portion and the outlet portion;
   at least one flow-restrictor element within the flow path and arranged between the inlet portion and the outlet portion of the flow path and configured to impart a pressure drop to the fluid; and a flow sensor arranged between the inlet portion and the outlet portion of the flow path, a first surface of the flow sensor is configured to be in direct fluid communication with the fluid that is flowing upstream of the at least one flow-restrictor element, a second surface on a portion of the flow sensor opposite to the first surface of the flow sensor is configured to be in direct fluid communication with the fluid that is flowing downstream of the at least one flow-restrictor element, the flow sensor being configured to sense a differential pressure in the fluid due to the at least one flow-restrictor element.

2. The flow meter of claim 1, wherein the at least one flow-restrictor element comprises a laminar flow element.

3. The flow meter of claim 1, wherein the at least one flow-restrictor element comprises an orifice.

4. The flow meter of claim 1, wherein the at least one flow-restrictor element comprises a plurality of orifices.

5. The flow meter of claim 1, wherein the inlet portion and the outlet portion of the flow path are arranged at angles that are about 0° to about 45° apart.

6. The flow meter of claim 1, wherein the inlet portion and the outlet portion of the flow path are arranged at angles that are about 45° to about 60° apart.

7. The flow meter of claim 1, further comprising a first bend in the flow path that is upstream to the at least one flow-restrictor element and a second bend that is downstream from the at least one flow-restrictor element.

8. The flow meter of claim 7, wherein at least one of the first bend and the second bend are at least five-to-seven characteristic linear dimensions away from the at least one flow-restrictor element, the characteristic linear dimension being based on an internal dimension of the flow path.

9. The flow meter of claim 1, wherein the flow sensor is a differential pressure sensor.

10. The flow meter of claim 1, wherein a turndown ratio of the flow meter is at least about 100:1.

11. A flow meter, comprising:

a flow path having an inlet portion and an outlet portion and configured to transport a fluid, the flow path having a single bend formed therein, the inlet portion and the outlet portion of the flow path being arranged substantially parallel to each other to transport the fluid in substantially opposing directions in the inlet portion and the outlet portion;

at least one flow-restrictor element within the flow path and arranged between the inlet portion and the outlet portion of the flow path and configured to impart a pressure drop to the fluid; and at least one flow sensor arranged at a different portion where the at least one flow sensor is arranged in a direction of a fluid flow having a first surface and a second surface opposite the first surface, the first surface of the flow sensor being configured to be in direct fluid communication with the fluid that is flowing upstream of the at least one flow-restrictor element, the second surface being configured to be in direct fluid communication with the fluid that is flowing downstream of the at least one flow-restrictor element, the flow sensor being configured to sense a differential pressure in the fluid due to the at least one flow-restrictor element.

12. The flow meter of claim 11, wherein the at least one restrictor element is located within the single bend in the flow path.

13. The flow meter of claim 11, wherein the at least one flow-restrictor element is a laminar-flow element.

14. The flow meter of claim 11, wherein the at least one flow-restrictor is a plate configured transverse to a direction of fluid flow having at least one orifice formed therethrough.

15. The flow meter of claim 11, wherein the single bend in the flow path has a reduced cross-sectional area as compared with a cross-sectional area of remaining portions of the flow path, the at least one flow-restrictor comprising the reduced cross-sectional area.

16. The flow meter of claim 11, wherein a cross-sectional area of the inlet portion of the flow path is greater than a cross-sectional area of the outlet portion of the flow path.

17. The flow meter of claim 11, wherein a cross-sectional area of the outlet portion of the flow path is greater than a cross-sectional area of the inlet portion of the flow path.

18. The flow meter of claim 11, wherein the flow meter is configured to have no dead volumes located therein.

19. A flow meter, comprising:

an upstream portion flow path and a downstream portion flow path to transport a fluid, the upstream portion flow path and the downstream portion flow path being arranged substantially parallel to each other to transport the fluid in substantially opposing directions in the upstream portion flow path and the downstream portion flow path;

a flow-sensor carrier arranged transverse to a direction of the transported fluid and between the upstream portion flow path and the downstream portion flow path;

at least one orifice formed through the flow-sensor carrier in substantially a same direction as a direction of the fluid, the at least one orifice to provide a pressure drop between the upstream portion flow path and the downstream portion flow path; and a flow sensor formed within the flow-sensor carrier and having a first surface and a second surface opposite the first surface, the first surface of the flow sensor being configured to be in direct fluid communication with the fluid that is flowing upstream of the flow-sensor carrier and the second surface of the flow sensor being configured to be in direct fluid communication with the fluid that is flowing downstream of the flow-sensor carrier, the flow sensor being configured to sense a differential pressure in the fluid due to the at least one orifice.

\* \* \* \* \*